ic Telescopes

United States Patent [19]
Shafer

[11] 4,342,503
[45] Aug. 3, 1982

[54] CATADIOPTRIC TELESCOPES

[75] Inventor: David R. Shafer, Fairfield, Conn.

[73] Assignee: The Perkin-Elmer Corporation, Norwalk, Conn.

[21] Appl. No.: 82,699

[22] Filed: Oct. 9, 1979

[51] Int. Cl.³ .............................................. G02B 17/08
[52] U.S. Cl. ..................................... 350/443; 350/444
[58] Field of Search ............... 350/200, 201, 199, 442, 350/443, 444

[56] References Cited
U.S. PATENT DOCUMENTS 2,608,129  8/1952  Taylor ................................ 350/442
4,061,420  12/1977  Kapreliau et al. ................. 350/200

Primary Examiner—John K. Corbin
Assistant Examiner—Rebecca D. Gass
Attorney, Agent, or Firm—S. A. Giarratana; E. T. Grimes; T. P. Murphy

[57] ABSTRACT

The first element comprises a relatively thin transmissive shell concave toward the front. The second element comprises a mirror concave toward the front. The front surface of the shell may be spherical, and the rear surface aspheric, or vice versa. The central portion of the first element on either the front or back surface is mirrored to form the secondary of the system. Preferably the secondary mirror is on the front of the first element. In one embodiment the second element is also a transmissive shell. In one form of this embodiment the second transmissive shell is aspheric on the front and spherical on the back. In another form it is spherical on the front and aspheric on the back. In both of these forms the primary mirror is located on the back of the second element. In another embodiment the second transmissive element is aspheric on the front and flat on the back; the front surface being mirrored except for the central portion thereof, through which light from the secondary is focused. In most embodiments all radii of curvature (the base curve in case of aspherics) are substantially equal. Higher dispersion in the second shell than in the first can correct for spherochromatism.

9 Claims, 11 Drawing Figures

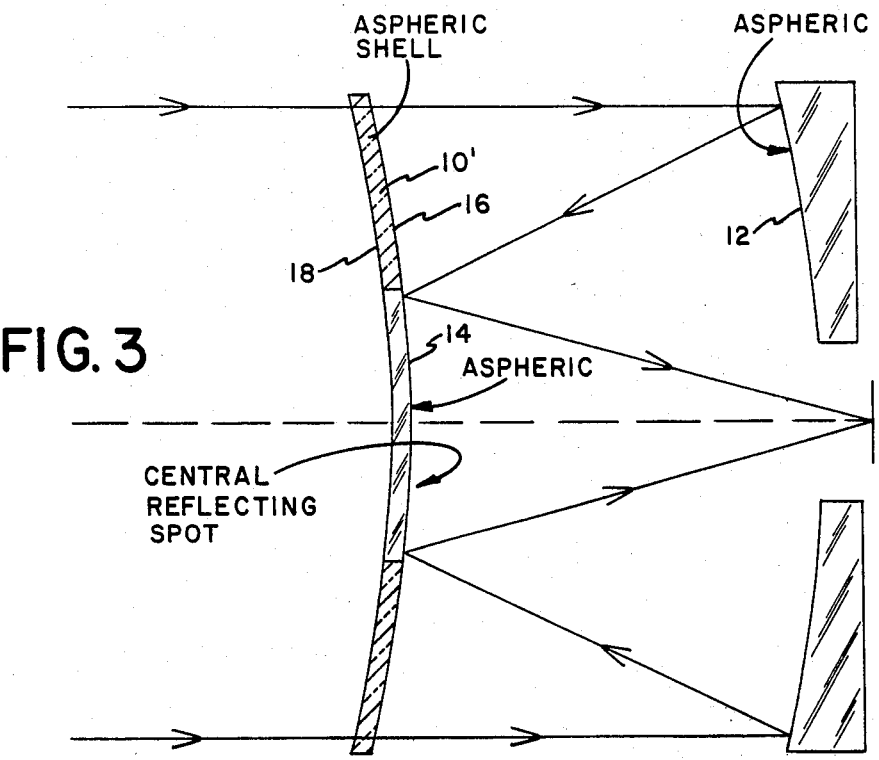
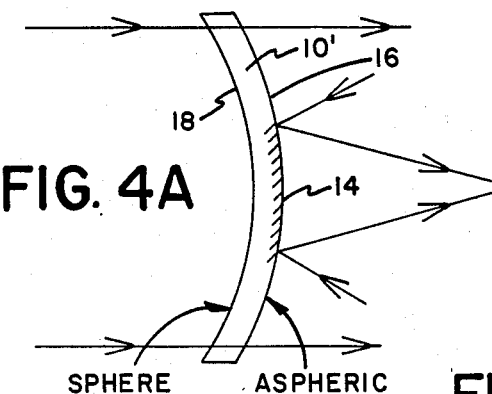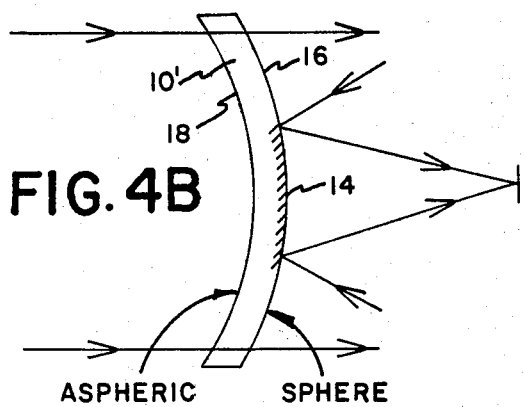
FIG. 4
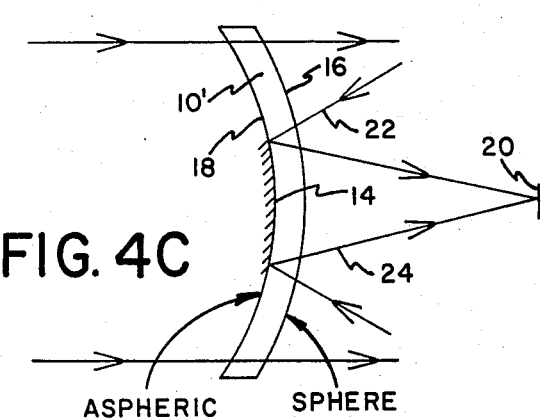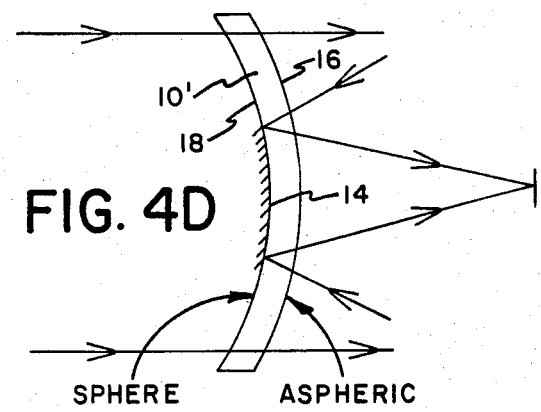

CATADIOPTRIC TELESCOPES

TECHNICAL FIELD

This invention relates to Catadioptric telescopes. More particularly it relates to well-corrected two-element catadioptric telescopes having a flat image. The telescopes are corrected for spherical aberration, coma, and astigmatism.

BACKGROUND ART

The three element Schmidt-Cassegrain telescope is a well-known catadioptric system that can be corrected for spherical aberration, coma, astigmatism, and Petzval curvature. The invention provides a version with the same aberration correction, but with only two elements. There are just three optical surfaces that need to be made, two of which are aspheric. Because of the simplicity of this two-element design, alignment and environmental stability is better than that of more conventional systems. It is also a very compact system, with a length that is only 45% of the system focal length.

FIG. 1 shows an example of a three-element Schmidt-Cassegrain telescope and represents a design that can be corrected for spherical aberration, coma, astigmatism, and Petzval curvature. The aspheric plate 10, primary 12 and secondary 14 aspheric mirrors give the designer enough variables so that a whole family of designs with these aberration corrections can be produced. One can use this surplus of design variables to try for some additional system features, such as correction for distortion, or small obscuration, or making one of the mirrors with a spherical surface. Some of these options have been described by E. H. Linfoot in his excellent review article *Recent Advances in Optics*, published by Oxford University Press, 1955, page 259.

Some difficulties with the Schmidt-Cassegrain telescope are that requiring three elements complicates the mechanical design necessary to support them and protect them from distortion and position change due to temperature changes. Furthermore, although methods for replicating the aspheric Schmidt corrector plate are now known, which are fairly efficient and inexpensive, manufacture of the aspheric primary and secondary mirrors 12 and 14 is an expensive, time consuming, and, in part, hand operation.

Thus, it would be highly desirable if the number of elements in a Cassegranian system could be reduced to two, for mechanical and thermal consideration and in order to reduce the number of aspheric elements that have to be manufactured. Furthermore, it would be highly desirable if the two elements were capable of being manufactured by simple manufacturing methods such as replication. Of course a two element design would not be efficacious if it could not be provided with the same aberration corrections as the Schmidt-Cassegrain system.

OBJECTS OF THE INVENTION

It is therefore an object of the invention to provide two-element Catadioptric telescopes.

Another object of the invention is to provide such telescopes corrected for spherical aberration, coma, astigmatism, and having a flat field; that is, being corrected for Petzval curvature.

A still further object of the invention is to provide such two-element telescopes that are easy to align and environmentally stable.

Yet another object of the invention is to provide such two-element telescopes comprising just three optical surfaces.

Yet still another object of the invention is to provide such two-element telescopes, the elements of which may be manufactured by simple replication techniques.

A further object of the invention is to provide such telescopes corrected for spherochromatism.

Another object of the invention is to provide such telescopes providing exact correction for longitudinal and lateral color.

Other objects of the invention will in part be obvious and will in part appear hereinafter.

The invention accordingly comprises features of construction, the particular elements and arrangements of parts which will be exemplified in the constructions hereinafter set forth. The scope of the invention will be indicated in the claims.

THE DRAWINGS

For a fuller understanding of the nature and objects of the invention reference should be had to the following detailed description taken in connection with the accompanying drawings in which:

FIG. 3 is a diagram of a two-element telescope according to the invention;

Figure 5:
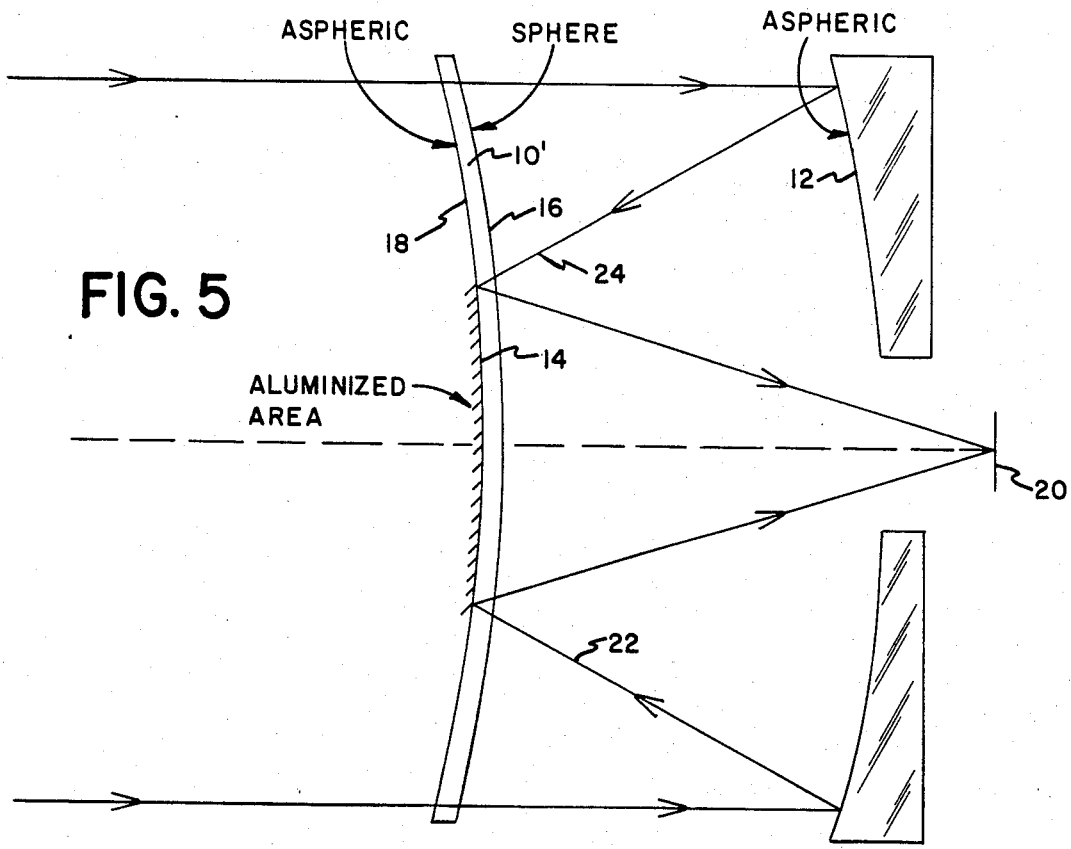
Figure 6:
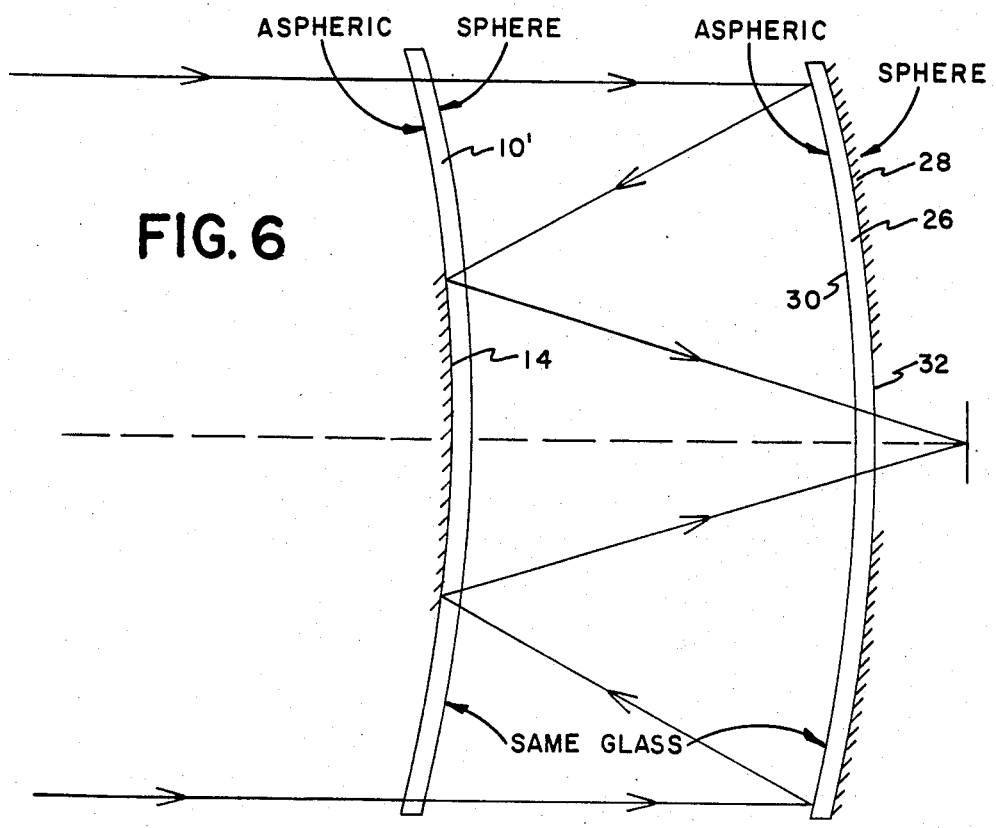
Figure 7:
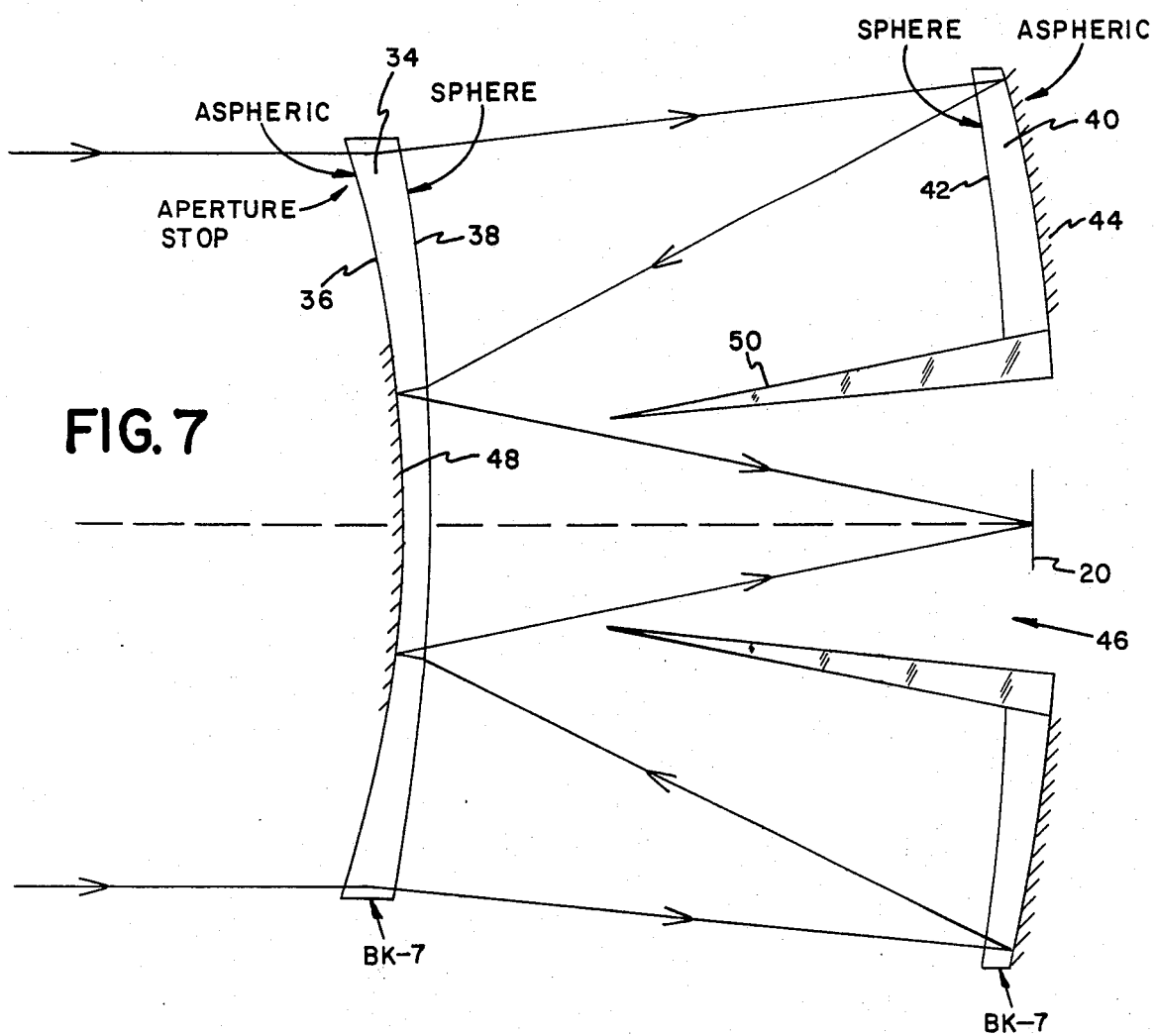
Figure 8:
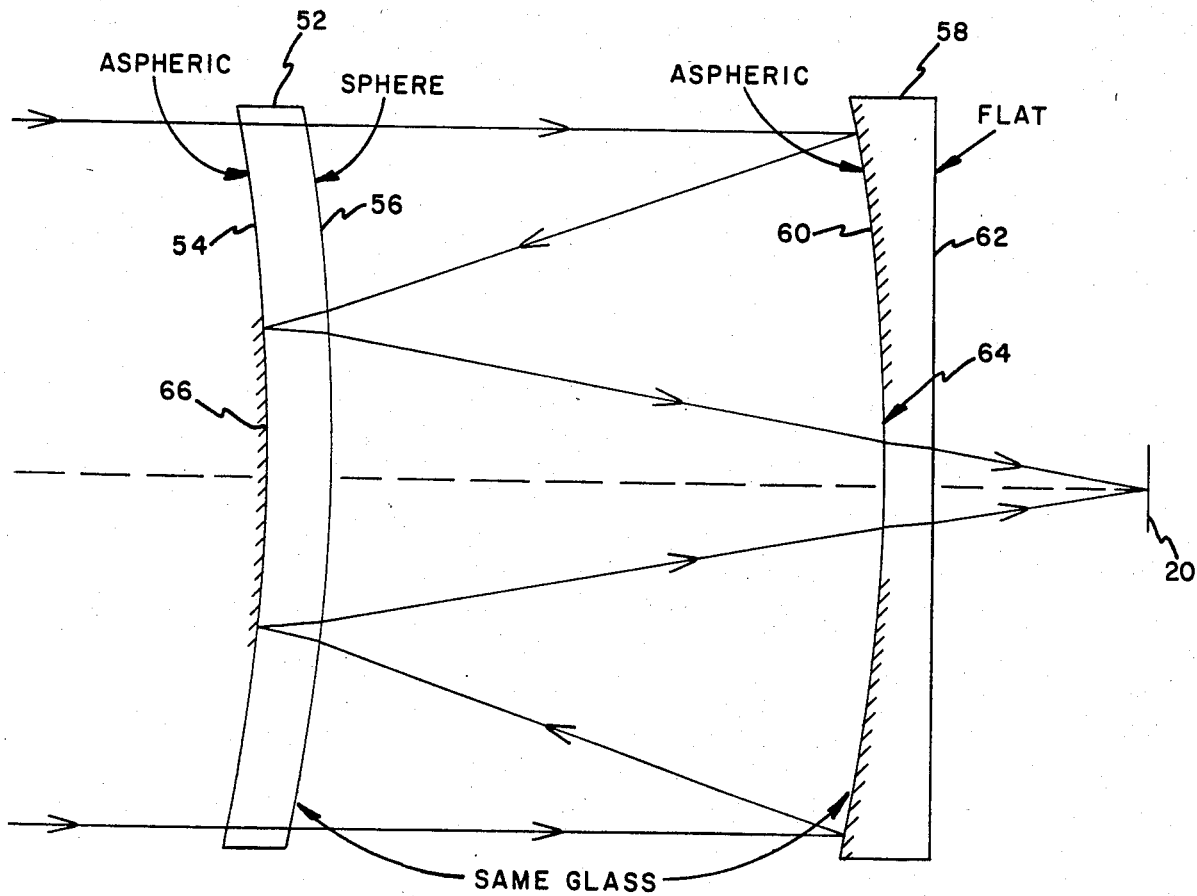

FIG. 4, comprising FIGS. 4A through 4C, comprises four diagrams of four possible designs for the front element of two-element telescopes according to the invention;

FIG. 5 is a diagram of a well-corrected two element telescope according to the invention having a flat image;

FIG. 6 is a diagram of a two-element telescope according to the invention corrected for spherochromatism;

FIG. 7 is a diagram of a two-element telescope having a three degree field of view, a speed of f/2.5 and a system length only 36% of the focal length of the telescope;

FIG. 8 is a diagram of a two-element telescope according to the invention exactly corrected for longitudinal and lateral color.

The same reference characters refer to similar elements throughout the several views of the drawings.

DISCLOSURE OF THE INVENTION

Figure 1:
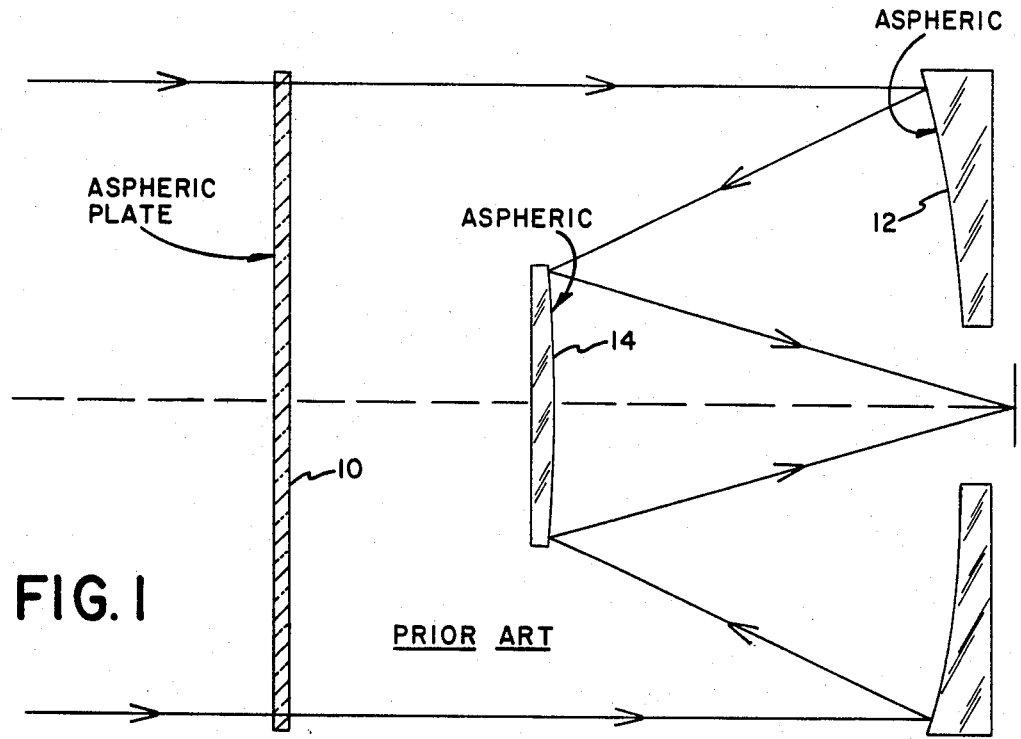
FIG. 1 is a diagramatic view of a flat image Schmidt Cassegrain telescope according to the prior art.
Figure 2:
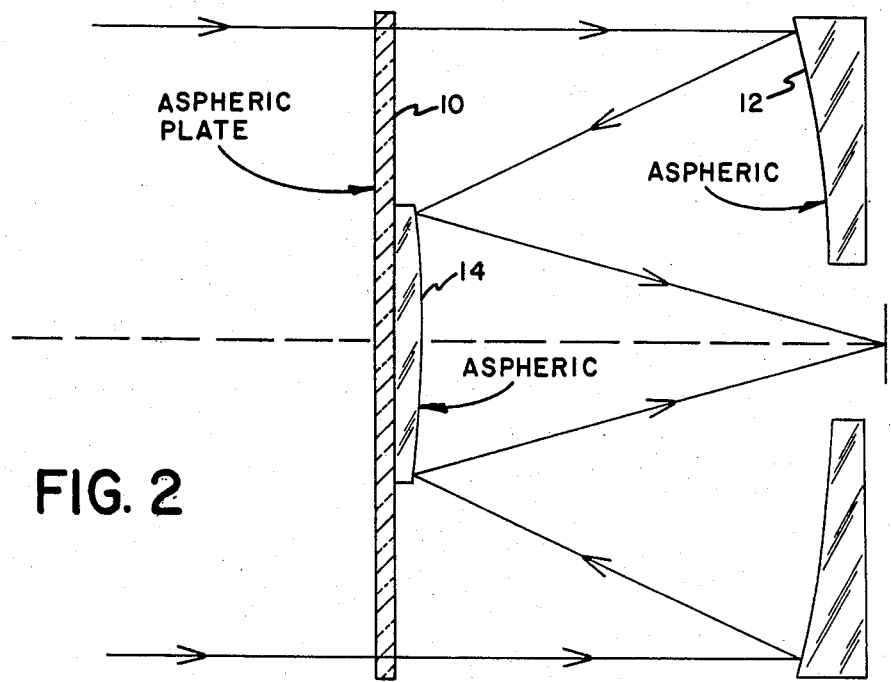
FIG. 2 is a diagram of a short Schmidt Cassegrain telescope.

Suppose we try to reduce the number of elements of a Schmidt-Cassegrain telescope from three to two, while still retaining the aberration correction. FIG. 2 shows a first step in this direction. There are still three elements, 10, 12 and 14, but the system is mechanically simpler, and shorter as a result of the secondary mirror 14 being mounted on the aspheric plate 10. By choosing aspherics for all three elements and having the base sphere radii of the mirrors 12 and 14 equal, one can correct this system for spherical aberration, coma, astigmatism, and Petzval curvature.

Referring to FIG. 3, let us curve the aspheric plate 10 so that it becomes a thin shell 10' with the same radius as the primary mirror 12. The shell will have no power and the only point of this move is to match the radius of the secondary mirror 14 (which is also the radius of the primary mirror 12, for Petzval correction). Now the secondary mirror 14 becomes a reflecting spot deposited on the shell 10′. The question then becomes whether the spacing and the aspherics can be chosen for both elements such that spherical aberration, coma, and astigmatism will be corrected?

The answer is yes, but not as shown in FIG. 3. In order to be a true two-element design, the secondary mirror 14 must have both the same radius and the same surface figure as the back surface 16 of the aspheric shell 10′. If the back surface of the shell had a different figure than the central reflecting area 14, then it would really be a three-element design.

It turns out that there are four possible ways to have a two-element system, depending on whether the front surface 18 or the back surface 16 of the shell 10′ is aspheric and whether the secondary mirror 14 is on the front or back surface of the shell. FIG. 4 illustrates these four design types, showing only the shell 10′.

The four cases are: in FIG. 4A and FIG. 4B the secondary mirror surface 14 is located on the back surface of the aspheric shell 10′; in FIGS. 4C and 4D the secondary mirror surface 14 is located on the front surface 18 of the aspheric shell 10′.

The case of FIG. 4A differs from the case of FIG. 4B in that in FIG. 4A surface 18 is spherical and surface 16 is aspheric, whereas in FIG. 4B surface 18 is aspheric and surface 16 is spherical. Similarly, in FIG. 4C surface 18 is aspheric and surface 16 is spherical and in FIG. 4D surface 18 is spherical and surface 16 aspheric.

Three of these four two-element designs cannot be corrected for spherical aberration, coma, and astigmatism. Petzval curvature is automatically corrected (i.e. a flat image is produced) because the shell has no power and the primary and secondary mirrors have the same radius. One of the four design types can be corrected for all these aberrations, and it is that of FIG. 4C.

BEST MODE FOR CARRYING OUT THE INVENTION

The design shown in FIG. 4C is shown in more detail in FIG. 5. The light goes through the shell 10′ on the way to the secondary mirror 14 and through it again to reach the image 20. The front surface 18 of the shell 10′ is aspheric, the back surface 16 is spherical, and the primary mirror 12 (FIG. 3) is aspheric. Both aspherics are oblate spheroids. The separation of the elements depends weakly on the index of refraction of the shell, and does not change much over that shown when the index of refraction of the glass varies from $n=1.5$ to $n=2.0$.

Since the shell 10′ has no power and is arbitrarily thin, it has no longitudinal or lateral color. There is quite a bit of spherochromatism, but three-element flat image Schmidt-Cassegrains have the same problem. In practice, the shell may be made thicker than that shown to give greater structural strength. It can then be slightly retouched so that the design has no longitudinal color by making the front and back radii a little different. This new design is not, however, like the Bouwers or Maksutov catadioptric designs, which also have a refractive shell but one that serves a completely different purpose than does the thin shell here.

The obscuration due to the secondary mirror 14 covers about 20% of the area on-axis. The magnification of the secondary mirror reflection is rather weak—an f/1.0 primary mirror 12 gives an f/1.7 system. The image is clearly in a good position. The back 16 of the shell 10′ has to be antireflection coated over the area between outer rays 22 and 24, to suppress a ghost image due to light from the primary mirror 12 that is reflected from the back of the shell.

The back focal length can be increased while still retaining all the monochromatic correction by adding a small amount of negative power to the first element 10′, and reoptimizing. This does introduce longitudinal color, however.

It is interesting to note that while Cases illustrated in FIGS. 4A and 4C have an aspheric secondary mirror in both cases—they really are different in an important way. In FIG. 4A the aspheric secondary 14 is seen in air, while in FIG. 4C it is buried in glass. In fact, the design of FIG. 4C really consists of an aspheric secondary mirror 14 in contact with an identical, but inverse, aspheric glass shell 10′. This causes the aberration theory of this case to be quite different from the case illustrated in FIG. 4A, and is why one system works and the other does not.

This same distinction allows a very desirable variation of the FIG. 5 system to be designed. The design of FIG. 5 has a fair amount of spherochromatism, due to the refractive aspheric first element 10′. For monochromatic situations, the FIG. 5 design can be used as is, but broad spectral band applications would pretty much require correction of spherochromatism. Fortunately, the FIG. 5 design can be changed slightly so that this aberration is corrected, without adding any extra elements.

This is accomplished as shown in FIG. 6. The primary mirror 12 is made into a thin aspheric shell with the same radii as the front shell. The mirror surface 28 is on the back. It is possible to put the aspheric surface on the front 30 or the back 32 of this second shell 28. In either case the aspheric surfaces is in contact with glass, so we will have spherochromatism from this element 28 as well as from the front element 10′. Because of an oversight of nature, the contributions of the two elements are of opposite signs and can be made to cancel. If the aspheric in FIG. 6 is put on the back 32 of the second shell 26, (rather than as shown) it turns out that spherochromatism can be corrected if the second shell 26 is made of a much more dispersive material than the first 10′. Schott glass BK-7 for the second and SF-6 for the first meet this requirement. The optical characteristics of Schott glass BK-7 is a glass with a refractive index of 1.5168 and dispersive number 64.17 and glass SF-6 is a glass of refractive index of 1.80518 and dispersive number 25.43. These characteristics were obtained from the Schott glass catalogue.

If the aspheric is put on the front 30 of the second shell 28, as shown in FIG. 6, the situation is quite different. It then turns out that spherochromatism is corrected if the same glass is used for both shells 10′ and 26. The primary spherochromatism will be zero if the index of both shells is about $n=1.47$, which corresponds to fused silica. If a different material is used, like Schott BK-7 glass, the spherochromatism will be very small, but can be made zero by slightly changing the radii of the shells. This can be done while still achieving correction for longitudinal color, spherical aberration, coma, astigmatism, and Petzval curvature. A small amount of lateral color will be present, however.

The other case, with the aspheric on the back 28 of the second element 26, is corrected for spherochromatism if BK-7 and SF-6 glasses are used, as already stated. It can be corrected with the same glass for both elements, as well as for spherical aberration, coma, astigmatism, Petzval curvature, and longitudinal color, by making the two elements have some power. Since the spherochromatism contributions of the two elements are far from equal for this case (same glass, aspheric on back of second element), cancellation only occurs when the element radii are made to depart by a substantial amount from the equal radii starting point of the design.

The result is a design that happens to have a smaller obscuration than the FIG. 6 design—covering about 12% of the area instead of the 20% obscuration of the other design. It also turns out that the higher-order aberration correction is better than the FIG. 6 design.

FIG. 7 shows an example of a design that is corrected for spherochromatism. It is an f/2.5 system with a 3° diameter circular field of view.

The design comprises a first shell 34 having a aspheric front surface 36 and a spherical back surface 38 and a second shell 40 having a spherical front surface 42 and an aspherical rear mirrored surface 44. The rear element 40 has a circular opening therein 46 to accommodate the image plane 20. The secondary mirror 48 is aluminized on the front surface 36 of the first element 34 and the aspheric rear surface 44 of the second element 40 is aluminized to provide the primary mirror 44.

In addition to the circularly symmetric baffle indicated at 50, the reflecting spot 48 on the first element is oversized, giving complete shielding of the focal plane 20 from stray light paths. This increases the area obscuration up to 25% from the 12% value it would have for an unbaffled system. A smaller field of view, of course, would lead to a smaller obscuration due to baffling. The design data are as follows:

TABLE I

Front Element 34
Front surface 36 radius = −5.9726 units
Back surface 38 radius = −10.2851 units
Thickness = .1244
Material = Schott BK-7 glass
Front surface 36 aspheric sag relative to the base sphere
$= -2.9920 \times 10^{-3} y^4$
$+ 6.7279 \times 10^{-4} y^6$
$- 1.4995 \times 10^{-4} y^8$
$+ 1.1729 \times 10^{-5} y^{10}$
Back Element 40
Front surface 42 radius = −15.5658 units
Back surface 44 radius = −10.1143 units
Thickness = .2489
Material = Schott BK-7 glass
Back surface 44 aspheric sag relative to the base sphere
$= -1.4761 \times 10^{-4} y^4$
$+ 1.0064 \times 10^{-5} y^6$
$- 1.4115 \times 10^{-6} y^8$
$+ 8.2068 \times 10^{-8} y^{10}$
Element separation is 3.2261 units
Back focus is .0059 units in back of the vertex of the back surface 44 of the second element 40.

The system was designed to operate over the wavelength range of 0.3650 to 1.014 microns. Ghost image problems require broad-band antireflection coatings on surfaces 36, 38 and 42, for effective use of this very wide spectral region. Schott BK-7 glass was used in the design, but fused silica or plastic are other interesting alternatives.

The two aspheric surfaces could be formed by injection molding with plastic, and the result would be a high-performance two-element system that would have a low cost in high-volume production numbers. Replication of an epoxy layer onto BK-7 elements would also be a way of producing the aspheric surfaces at low cost if many units were to be made. Since elements 34 and 40 are thin and each have one spherical surface they can be replicated in the same manner as Schmidt correctors as disclosed in U.S. Pat. Nos. 3,837,124, 3,837,125 and 3,889,431, by deforming shells having concentric spherical surfaces under vacuum on to an aspheric surface having the inverse aspheric curvature of that desired and grinding the deformed upper surface to the desired spherical curvature either of surface 38 for element 34, or 42 for element 40.

In the design of FIG. 7, on axis, 80% of the energy falls within a 24 arc second diameter spot size over the 0.3650–1.014 micron spectral range. Over the entire field, 80% of the energy falls within a 40 arc second diameter spot size over the spectral range. About 12 arc seconds is due to lateral color. A 25% area central obscuration is assumed in order to provide a baffled system.

There is a small amount of distortion: 0.08% over the 3° field of view, and a small amount of lateral color. Either could be corrected by adding a lens somewhere before the image, but that would give a three-element design. There does not seem to be any two-element design that has correction for spherical aberration, coma, astigmatism, Petzval curvature, longitudinal color, spherochromatism, and lateral color or distortion. If spherochromatism is dropped, lateral color can be corrected by the design shown in FIG. 8.

Referring to FIG. 8, first element 52 has an aspheric front surface 54 and a spherical rear surface 56. Second element 58 has an aspheric front surface 60 and a flat rear surface 62. Aspheric surface 60 is mirrored, except over a central region generally indicated at 64 to provide the primary mirror of the system. Aspheric surface 54 is aluminized at 66 to provide the secondary mirror. It is essential that the light go through the second element 58 just before reaching the image 20. In all the other designs shown, by contrast, it does not really matter if the light path goes through a hole in the second element 40, as shown in FIG. 7, or through the element, as shown in FIG. 6.

Finite conjugate versions of all designs are also possible, of course. Another design aspect worth mentioning is that all the designs can easily be made to have a longer back focus without appreciably affecting the performance in case a chopper or image tube size requires the image to be located farther in back of the second element.

Several two-element designs that are highly corrected for both monochromatic and chromatic aberrations are possible. The simplicity of these systems gives them more alignment stability and make them less expensive than multi-element Schmidt-Cassegrain designs having equivalent performance, especially if replication or injection molding techniques are used. The light weight and short length of these new designs are also attractive features.

It will thus be seen that the objects set forth above among those made apparent from the preceding description, are efficiently attained, and since certain changes may be made in the above described elements and constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Having described my invention what I claim as new and desire to secure by Letters Patent is:

1. A two-element catadioptric telescope consisting of:
   (A) a first element comprising a transmissive shell
      (a) the front surface thereof being concave toward the front,
      (b) the back surface thereof also being concave toward the front,
      (c) said front and back surfaces being aspheric and spherical, respectively,
      (d) the central portion of one of said surfaces being mirrored to form the secondary mirror of the telescope; and,
   (B) a second element located behind said shell
      (a) a surface of said second element being concave toward the front, and mirrored to form the primary mirror of the system.

2. A telescope as defined in claim 1 wherein said secondary mirror is on the front surface of said first element.

3. A telescope as defined in claim 2 or 1 wherein said mirrored surface of said second element is aspheric.

4. A telescope as defined in claim 1 wherein said mirrored surface of said second element is aspheric.

5. A telescope as defined in claim 1 wherein said first element is defined by:
   Front surface radius = −5.9726
   Back surface radius = −10.2851
   Thickness = 0.1244
   Material = Schott BK-7 glass and the front surface aspheric sag relative to the base sphere is
   $-2.9920 \times 10^{-3} Y^4$
   $+6.7279 \times 10^{-4} Y^6$
   $-1.4995 \times 10^{-4} Y^8$
   $+1.1729 \times 10^{-5} Y^{10}$ and said second element being a transmissive shell having said primary mirror on the back surface thereof and defined by:
   Front surface radius = 15.5658
   Back surface radius = 10.1143
   Thickness = 0.2489
   Material = Schott BK-7 glass the back surface aspheric sag relative to the base sphere is:
   $-1.4761 \times 10^{-4} Y^4$
   $+1.0064 \times 10^{-5} Y^6$
   $-1.4115 \times 10^{-6} Y^8$
   $+8.2068 \times 10^{-8} Y^{10}$;

the element separation is 3.2261.

6. A telescope as defined in claim 1 wherein said second element is a second transmissive shell, both surfaces of said second shell being concave toward the front, the back surface of said second shell being mirrored to form said primary mirror, with said front surface of said second shell being spherical and said back surface aspheric.

7. A two-element catadioptric telescope consisting of:
   (A) a first element comprising a transmissive shell
      (a) the front surface thereof being concave toward the front,
      (b) the back surface thereof also being concave toward the front,
      (c) the central portion of said front surface being mirrored to form the secondary mirror of the telescope; and,
   (B) a second element located behind said shell
      (a) a surface of said second element being concave toward the front, and mirrored to form the primary mirror of the system.

8. A two-element catadioptric telescope consisting of:
   (A) a first element comprising a transmissive shell
      (a) the front surface thereof being concave toward the front,
      (b) the back surface thereof also being concave toward the front,
      (c) the central portion of one of said surfaces being mirrored to form the secondary mirror of the telescope; and
   (B) a second element located behind said shell
      (a) a surface of said second element being aspheric and concave toward the front, and mirrored to form the primary mirror of the system.

9. A two-element catadioptric telescope consisting of:
   (A) a first element comprising a transmissive shell
      (a) the front surface thereof being concave toward the front,
      (b) the back surface thereof also being concave toward the front,
      (c) the central portion of one of said surfaces being mirrored to form the secondary mirror of the telescope;
   (B) a second element located behind said shell
      (a) a surface of said second element being concave toward the front, and mirrored to form the primary mirror of the system, and said first element being defined by:
      Front surface radius = −5.9726
      Back surface radius = −10.2851
      Thickness = 0.1244
      Material = Schott BK-7 glass and the front surface aspheric sag relative to the base sphere is
   $-2.9920 \times 10^3 Y^4$
   $+6.7279 \times 10^{-4} Y^6$
   $-1.4995 \times 10^{-4} Y^8$
   $+1.1729 \times 10^{-5} Y^{10}$ and said second element being a transmissive shell having said primary mirror on the back surface thereof and defined by:
   Front surface radius = 15.5658
   Back surface radius = 10.1143
   Thickness = 0.2489
   Material = Schott BK-7 the back surface aspheric sag relative to the base sphere is
   $-1.4761 \times 10^{-4} Y^4$
   $+1.0064 \times 10^{-5} Y^6$
   $-1.4115 \times 10^{-6} Y^8$
   $+8.2068 \times 10^{-8} Y^{10}$;

the element separation is 3.2261.

* * * * *